(12) United States Patent
Jung

(10) Patent No.: US 8,698,869 B2
(45) Date of Patent: Apr. 15, 2014

(54) METHOD AND APPARATUS FOR CONTROLLING INTRA-REFRESHING IN A VIDEO TELEPHONY COMMUNICATION SYSTEM

(75) Inventor: Kyung-Hun Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/536,311

(22) Filed: Jun. 28, 2012

(65) Prior Publication Data

US 2013/0169744 A1 Jul. 4, 2013

Related U.S. Application Data

(63) Continuation of application No. 11/970,240, filed on Jan. 7, 2008, now Pat. No. 8,233,023.

(30) Foreign Application Priority Data

Jan. 6, 2007 (KR) .......................... 10-2007-0001817

(51) Int. Cl.
*H04R 7/14* (2006.01)
(52) U.S. Cl.
USPC .................................... 348/14.01; 348/14.12

(58) Field of Classification Search
USPC ................... 348/14.01–14.16; 370/260–271; 375/240.01, 240.12; 379/201.01, 379/202.01
See application file for complete search history.

(56) References Cited

U.S. PATENT DOCUMENTS

| | | |
|---|---|---|
| 7,020,203 B1 | 3/2006 | Horowitz et al. |
| 2003/0016754 A1 | 1/2003 | Gandhi et al. |
| 2003/0120950 A1 | 6/2003 | Hunt |
| 2006/0078051 A1 | 4/2006 | Liang et al. |
| 2007/0120950 A1 | 5/2007 | Jokimies et al. |

*Primary Examiner* — Brian Ensey
(74) *Attorney, Agent, or Firm* — The Farrell Law Firm, P.C.

(57) ABSTRACT

A method for requesting intra-refreshing in a video telephone communication system is provided. The method includes checking, by a reception apparatus, a sequence number and a Cyclic Redundancy Check (CRC) for received video packet data to detect presence of a packet loss: decoding the received video packet data to check frame type information: generating a control signal for requesting intra-refreshing in accordance with the checked frame type information and the sequence number: and transmitting the generated control signal for requesting intra-refreshing to a transmission apparatus.

21 Claims, 14 Drawing Sheets

METHOD AND APPARATUS FOR CONTROLLING INTRA-REFRESHING IN A VIDEO TELEPHONY COMMUNICATION SYSTEM

PRIORITY

This application is a Continuation Application of U.S. application Ser. No. 11/970,240 filed in the U.S. Patent and Trademark Office on Jan. 7, 2008, and claims priority under 35 U.S.C. §119(a) to a Korean Patent Application filed in the Korean Intellectual Property Office on Jan. 6, 2007 and assigned Serial No. 10-2007-0001817, the entire contents of each of which are incorporated herein by reference.

BACKGROUND OF THE INVENTION

1. Field of the Invention

The present invention relates generally to a communication system, and more particularly, to an intra-refreshing control method and apparatus for efficiently processing image quality of video data in a video telephone communication system.

2. Description of the Related Art

The Wideband Code Division Multiple Access (WCDMA) scheme, a wireless access scheme used for the $3^{rd}$ generation mobile communication system, aims at supporting broadband services while providing high Quality of Service (QoS). The WCDMA scheme is being developed with the application of the communication schemes for supporting high-speed Internet access, high-speed image transmission, and high-quality packet data transmission. There are several possible schemes proposed for performing video telephony over the WCDMA communication system.

In the video telephony system, a video encoder compresses an input image in two different frame types. A frame obtained by compressing a one-sheet image independently is called an 'I-frame', while a frame obtained by compressing only the difference between the current image and the previously encoded and decoded frame is called a 'P-frame'. Generally, the I-frame is 5 to 10 times greater than the P-frame in size. The video telephony system repeatedly performs a communication process of transmitting several tens or hundreds of P-frames after transmitting one I-frame.

In the video telephony system, new image quality recovery schemes are proposed to recover the image quality of video data when the received video data suffers a loss or an error, i.e., when it suffers from a transmission error. One of the recovery schemes includes an intra-refreshing scheme in which a receiver requests a transmitter to insert and transmit an I-frame before its original period.

FIG. 1 is a diagram illustrating basic architecture of a video telephone communication system to which the present invention is applicable. Generally, the video telephony communication system includes a transmitter (TX), a receiver (RX), and networks that exchange video data with the transmitter and the receiver.

Referring to FIG. 1, the transmitter includes a video encoder 101, a segmentation block 103, an error detection block (or CRC Attach block) 105, and a packetization block 110.

The video encoder 101 compresses the image that the transmitter intends to transmit. The segmentation block 103 segments the compressed image according to the transmission unit of the network. The error detection block 105 attaches an error detection code, or Cyclic Redundancy Check (CRC), used for detecting a transmission error, to the compressed and segmented video data. The packetization block 110 attaches a sequence number (S/N) indicating a sequence of the packet to the CRC-attached video stream to make a video packet stream suitable for transmission, and transmits it to a network 120. The video packet stream is transferred to the counterpart receiver such as the video telephone set or the communication apparatus, over the network 120 composed of various wired/wireless communication channels.

The receiver includes a de-packetization block 130, an error detection block (or S/N and CRC Check block) 145, a concatenation block 143, and a video decoder 141. The depacketization block 130 de-packetizes the video packet stream received over the network 120 into a video data part, a CRC part, and an S/N part.

The error detection block 145 generates a CRC of a video stream, and compares the generated CRC with the existing CRC. Further, the error detection block 145 checks an S/N, and determines whether the S/N is greater than the expected value. If the generated CRC is inconsistent with the CRC of the transmitted video packet, the error detection block 145 considers that the received video data includes an error. In addition, if the checked S/N is greater than the expected S/N, the error detection block 145 considers that a particular video packet has not arrived at the receiver as it is lost during its transmission.

In other words, if the generated CRC is consistent with the CRC of the transmitted video packet and the checked S/N is also equal to the expected value, it means that the received video packet has arrived as expected without error during its transmission, so the concatenation block 143 concatenates the received video data to the previously arrived video data, and transfers the resulting video data to the video decoder 141. The video decoder 141 decodes the video stream, providing the original video image. The video decoder 141 displays the decoded video image on the receiver, such as the video telephony set or communication apparatus.

However, if the two CRCs detected in the error detection block 145 are inconsistent with each other or the checked SN is greater than the expected value (S/N JUMP), the error detection block 145 immediately sends, to a controller 150, a signal indicating that an error is included in the received video data or the packet has not arrived at the receiver as it is lost in the network.

The controller 150 of the receiver transmits a signal indicating the presence of an error in the video data received at the network 160, or indicating the reception failure, to the transmitter over a wireless channel. Therefore, the network 160 transmits the error detection signal provided from the controller 150 of the receiver, to a controller 170 of the transmitter.

The controller 170 of the transmitter sends to the video encoder 101 a notification indicating the error occurred in the transmitted video data, thereby allowing the transmitter to recover the damaged image quality, i.e., to perform intra-refreshing. That is, at the request of the receiver, the transmitter immediately compresses/inserts/transmits an I-frame before its original period.

In other words, the controller 150 of the receiver sends a request for intra-refreshing to the controller 170 of the transmitter, and upon receipt of the intra-refreshing request signal from the receiver's controller 150, the controller 170 of the transmitter forwards it to the video encoder 101. Then the video encoder 101 of the transmitter immediately inserts an I-frame regardless of the state of the transmission frame, thereby allowing the receiver to stop the spread of the error and to recover the image quality.

Conventionally, as described above, the receiver sends an intra-refreshing request to the transmitter every time it detects that the received video data suffers a loss or an error. Then the transmitter compresses and transmits an I-frame every time in response to the intra-refreshing request from the receiver.

FIG. 2 is a diagram illustrating a conventional timing diagram for a description of a possible problem of intra-refreshing.

In the video telephony communication system, an arbitrary user A is assumed to be a transmitter and an arbitrary user B is assumed to be a receiver. If the receiver, or user B, checks the received video data and determines that the transmitted data has suffered a loss or an error, it sends an intra-refreshing request to the user A, or transmitter. That is, the receiver requests the transmitter, or user A, to transmit an I-frame obtained by compressing the entire image. However, if the receiver, or user B, detects occurrence of another error before the I-frame arrives from the transmitter, or user A, in response to the intra-refreshing request, the receiver sends again an intra-refreshing request.

Referring to FIG. 2, at time 210, the user B's receiver, which has detected that a received frame Pm has suffered a loss or an error, sends a request for transmission of an I-frame to the user A's transmitter to recover the image quality In this case, the user B's receiver transmits a Video Fast Picture Update Command (VFPU) signal to the user A's transmitter.

Thereafter, before receiving an I-frame from the user A's transmitter, or a response signal to the VFPU signal transmitted at time 210, the user B's receiver detects a loss or error of another video data, and sends again an intra-refreshing request therefore at time 230. That is, the user B's receiver transmits a VFPU signal for another loss or error to the user A's transmitter.

At time 215, the user A's transmitter receives the VFPU signal transmitted at time 210 from the user B's receiver, and transmits an I-frame 220 at time 220. Thereafter, at time 235 where the user A's transmitter has transmitted several P-frames after transmitting the I-frame 220, the user A's transmitter receives again a VFPU signal 230 from the user B's receiver. Then, at time 240, the user A's transmitter transmits an I-frame 240 in response to the intra-refreshing request sent at time 230.

In this way, the user B's receiver frequently sends an intra-refreshing request according to the error detection, and the user A's transmitter frequently transmits the I-frame in response thereto.

As the I-frame 220 arrives without error in response to the first intra-refreshing request due to the packet loss or error, the packet loss or error is fully recovered, but the second I-frame 240 does not contribute to the image quality. In this state, the transmitter frequently transmits the large-size I-frame, which causes a reduction in the total number of image frames actually received at the receiver. That decreases, from the standpoint of the receiver, the frame rate. Generally, the I-frame has a larger size, but is not higher than the P-frame in image quality.

FIG. 3 is a diagram illustrating a conventional timing diagram for a description of another possible problem of intra-refreshing.

Referring to FIG. 3, the receiver detects the occurrence of data loss or error in the previously received video data and sends an intra-refreshing request 260 to the transmitter according to the detection, and a compressed I-frame 250 periodically arrives without a loss of the video data before an I-frame 270 arrives from the transmitter, thereby fully recovering the lost image.

In this case, though the receiver has sent an intra-refreshing request 260, 265 to the transmitter, the intra-refreshing requested I-frame 270 does not always contribute to the quality improvement based on the image recovery. Unfortunately, however, the sending of the intra-refreshing request 260 causes a mere decrease in the number of image frames actually received at the receiver.

As described above, the conventional scheme sends an intra-refreshing request without comprehending the processing state of the video encoder in the counterpart for the received video data, i.e., in the counterpart transmitter or receiver, causing unnecessary transmission of the command signal. The unnecessary transmission of the I-frame due to the intra-refreshing causes a fatal problem that decreases an average transmission rate of the video frames.

SUMMARY OF THE INVENTION

The present invention has been made to address at least the above problems and/or disadvantages and to provide at least the advantages described below. Accordingly, an aspect of the present invention provides a method and apparatus for controlling an intra-refreshing operation by checking a state of video data.

Another aspect of the present invention provides a method and apparatus for allowing a transmitter and a receiver to control an intra-refreshing operation by checking a sequence number of video data.

An additional aspect of the present invention provides a method and apparatus in which a transmitter and a receiver variably control a transmission time of an intra-refreshing request and an I-frame depending on a loss or error of video data.

An further aspect of the present invention provides an intra-refreshing method and apparatus for increasing an average frame rate by checking a state of video data being processed in a transmitter and a receiver.

Another aspect of the present invention provides a method and apparatus for selectively performing intra-refreshing based on a loss of an image being received at a receiver and a type and sequence of a frame of video data.

Additionally, another aspect of the present invention provides a method and apparatus for estimating the number N of P-frames between at least two I-frames and an average frame rate by analyzing received video data.

Another further aspect of the present invention provides a method and apparatus for separately compressing and transmitting video data in accordance with the number N of P-frames between at least two estimated I-frames, an average frame rate, and a transmission delay.

Another aspect of the present invention provides a method and apparatus in which in response to an intra-refreshing request from a receiver, a controller of a transmitter performs intra-refreshing in accordance with a frame type of the currently compressed image, sequence information, and transmission delay.

An additional aspect of the present invention provides a method and apparatus in which a transmitter variably controls transmission of an I-frame for intra-refreshing in one transmission frame according to a change in channel condition.

According to one aspect of the present invention, a method for requesting intra-refreshing in a video telephony communication system is provided. A reception apparatus checks a sequence number and a Cyclic Redundancy Check (CRC) for received video packet data to detect presence of a packet loss. The received video data is decoded to check frame type information. A control signal is generated for requesting intra-refreshing in accordance with the checked frame type information and the sequence number. The generated control signal for requesting intra-refreshing is transmitted to a transmission apparatus.

According to another aspect of the present invention, a reception apparatus is provided for requesting intra-refreshing in a video telephony communication system. The apparatus includes an error detection block for checking a Cyclic Redundancy Check (CRC) attached to received video data to detect an error, and checking a sequence number of the received video data. The apparatus also includes a decoder for decoding the error-detected video data to check frame type information. Additionally, the apparatus includes a controller for generating a control signal for requesting intra-refreshing in accordance with the checked frame type information and the sequence number, and transmitting the generated control signal for requesting intra-refreshing to a transmission apparatus.

According to further another aspect of the present invention, a method for transmitting by a transmission apparatus an I-frame obtained by compressing an independent image in response to a request for intra-refreshing in a video telephony communication system is provided. It is determined whether a control signal for requesting transmission of an I-frame obtained by compressing an independent image is received from a reception apparatus. Frame type information and a sequence number of video data being compressed are checked. It is determined whether to transmit a temporary I-frame corresponding to the received control signal or to transmit an I-frame based on a predetermined period, in accordance with the checked frame type information and the sequence number The I-frame is transmitted to the reception apparatus using a variable time according to the determination.

According to yet another aspect of the present invention, a transmission apparatus for transmitting an I-frame obtained by compressing an independent image in response to a request for intra-refreshing in a video telephony communication system is provided. The apparatus includes a controller for determining whether a control signal for requesting transmission of an I-frame obtained by compressing an independent image is received from a reception apparatus, checking frame type information and a sequence number of video data being compressed, and determining whether to transmit a temporary I-frame corresponding to the received control signal or to transmit an I-frame based on a predetermined period, in accordance with the checked frame type information and the sequence number. The apparatus also includes an encoder for compressing video data into an independent image using a variable time and transmitting the video data to the reception apparatus according to the determination of the controller.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF THE PREFERRED EMBODIMENTS

Figure 1:
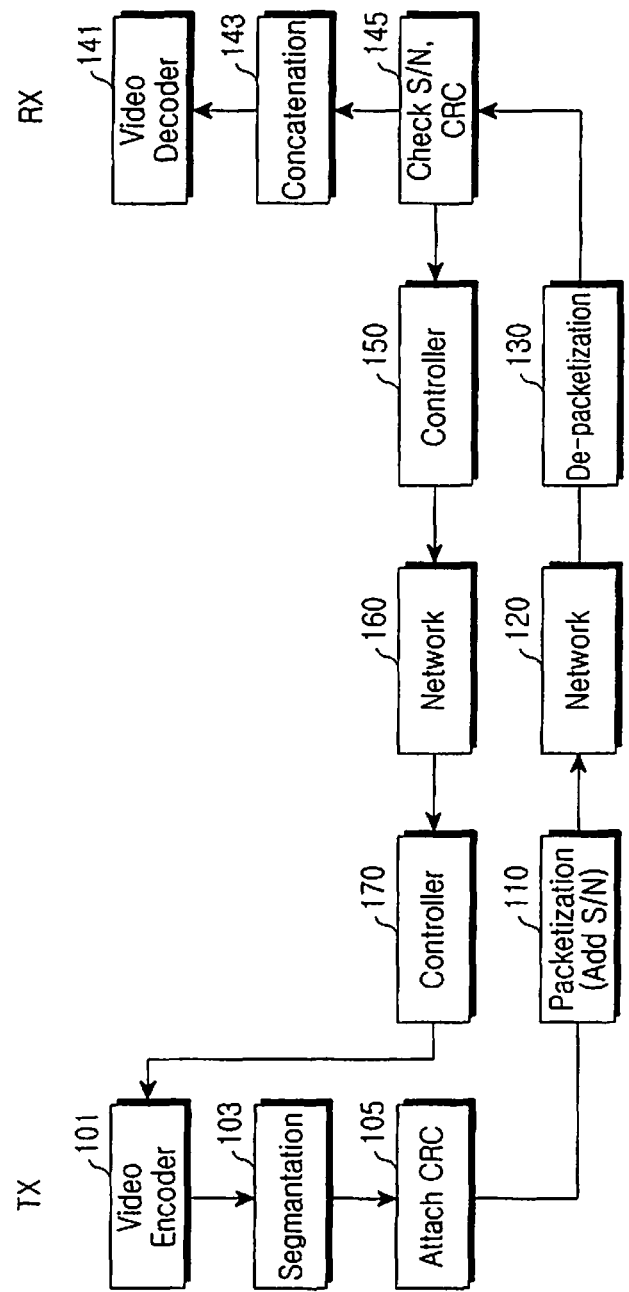
FIG. 1 is a diagram illustrating the schematic architecture of a video telephony communication system to which the prevent invention is applicable.

Preferred embodiments of the present invention are described in detail with reference to the annexed drawings. It should be noted that similar components are designated with similar reference numerals although they are illustrated in different drawings. Detailed descriptions of constructions or processes known in the art may be omitted to avoid obscuring the subject matter of the present invention.

The present invention provides video telephony services in a wired/wireless communication system. To this end, the present invention provides a scheme of making a request for transmission of an I-frame for recovering a transmission error of the video data transmitted in the video telephony-communication system, and efficiently realizing an intra-refreshing operation of transmitting the requested I-frame.

An operation of a receiver is characterized in that the receiver checks S/N and CRC of the received video data to perform error detection, and performs an intra-refreshing operation according to the error detection result in accordance with the type and sequence information of the frame being processed by a decoder of the receiver.

Figure 4:
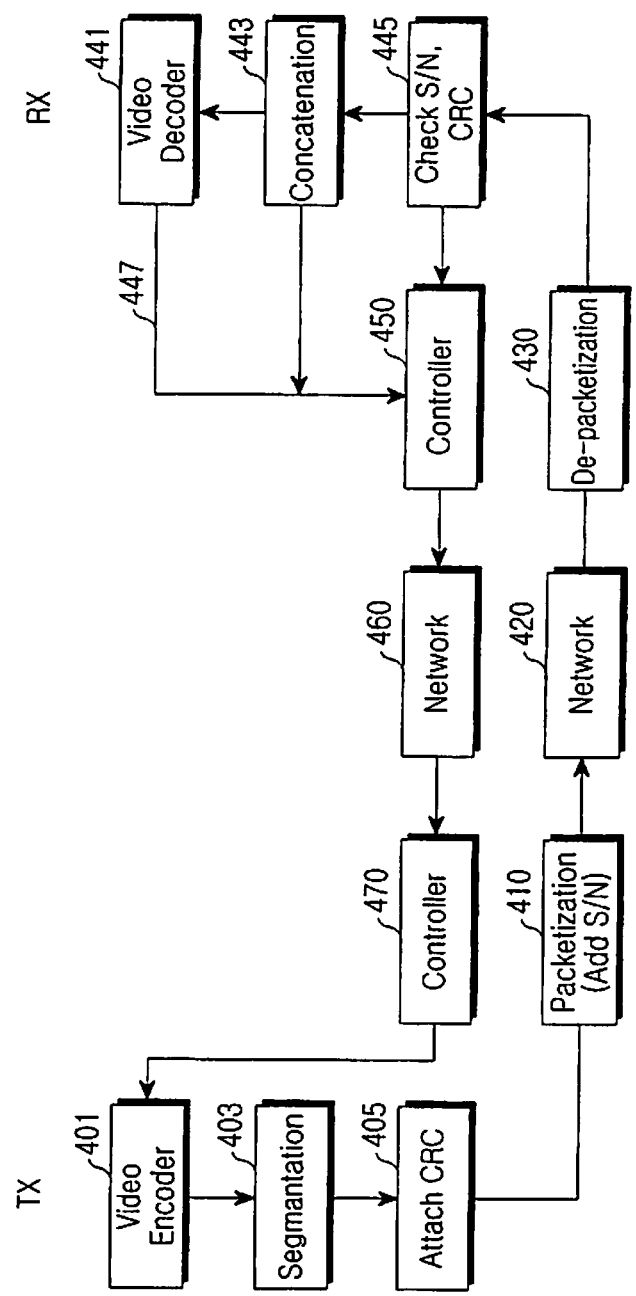
FIG. 4 is a diagram illustrating the architecture of the system with a receiver for performing intra-refreshing control according to an embodiment of the present invention.

FIG. 4 is a diagram illustrating the architecture of the system with a receiver for performing intra-refreshing control according to an embodiment of the present invention.

Referring to FIG. 4, a transmitter includes a video encoder 401, a segmentation block 403, an error detection block (or CRC Attach block) 405, and a packetization block 410.

The video encoder 401 compresses the image that the transmitter intends to transmit. The segmentation block 403 segments the compressed image frame according to the transmission unit of the network. For example, in a circuit-switched video telephony, one P-frame is segmented into 3 to 4 Adaptation Layer Packet Data Units (AL-PDUs). The error detection block 405 attaches a CRC for transmission error detection to each of the segmented AL-PDUs. The packetization block 410 adds an S/N indicating a sequence of the packet to each of the CRC-attached AL-PDUs to make the stream of SN-added packets, and transmits it to a network 420. The network 420 transmits the SN-added video packet stream, from the transmitter, to the target communication apparatus over a wireless communication channel. In other words, the network 420 transmits the SN-added video packet stream to the counterpart video telephony set, or the counterpart receiver.

The receiver includes a de-packetization block 430, an error detection block (or CRC Check block) 445, a concatenation block 443, and a video decoder 441. The de-packetization block 430 de-packetizes the video packet stream received over the network 420 into a video data part, a CRC part, and an S/N part.

The error detection block 445 generates a CRC of the video stream and compares the generated CRC with the existing CRC. Further, the error detection block 445 checks an S/N, and determines whether the checked S/N is not greater than the expected value. If the two CRCs detected in the error detection block 445 are inconsistent with each other or the checked S/N is greater than the expected value, i.e., the S/N has jumped (S/N JUMP), the error detection block 445 considers that the received video data includes an error therein or the video data is lost during its transmission. Then the error detection block 445 sends a notification signal indicating the data loss or error to a controller 450.

The controller 450 generates an intra-refreshing signal based on the error presence using the information 447, received from the video decoder 441, indicating the type of the corresponding video data, i.e., indicating in which frame the video data has suffered an error. That is, the controller 450 checks the information, received from the video decoder 441, indicating whether the frame of the erroneous video data is an I-frame or a P-frame. In addition, if the video data frame is a P-frame, the controller 450 checks sequence information indicating a sequence of the P-frame. This is to control the receiver not to unnecessarily frequently make the intra-refreshing request.

If the existing CRC and the generated CRC are consistent with each other and the checked S/N is also equal to the expected value, the error detection block 445 transfers the video data to the concatenation block 443. The concatenation block 443 concatenates the received AL-PDUs and transfers the result to the video decoder 441. The video decoder 441 decodes one data frame, and outputs its original video image. Therefore, the video decoder 441 displays the decoded video image on the display of the receiver, such as the video telephony set or communication apparatus.

In other words, if the two CRCs detected from the error detection block 445 are inconsistent with each other or the S/N of the received video packet is greater than expected, i.e., the S/N has jumped (S/N JUMP), the controller 450 determines whether to send a request for intra-refreshing to the transmitter, upon receiving the signal indicating that the received video data includes an error therein or has suffered reception failure. Here, if the controller 450 has presently sent a request for intra-refreshing to the transmitter, the controller 450 compares the time $t_2$ where the requested I-frame will arrive with the expected arrival time $t_1$ of the I-frame that the transmitter will periodically compress and transmit even though the controller 450 has sent no intra-refreshing request, and the controller 450 transmits an intra-refreshing request signal VFPU to the transmitter only when $t_1$ is later than $t_2$. On the contrary, when $t_1$ is equal to or earlier than $t_2$, the controller 450 does not make the intra-refreshing request, and the I-frame that the transmitter will periodically compress and transmit arrives, recovering the image quality.

After performing the foregoing operation, the controller 450 of the receiver transmits a signal indicating the presence of an error in the video data to controller 470 via the network 460, or indicating the reception failure, to the transmitter over a wireless channel.

In the $3^{rd}$ generation mobile communication system, the circuit-switched based video telephony system transmits a VFPU command signal associated with the intra-refreshing scheme. However, the packet-switched based video telephony system transmits an AVPF NACK signal indicating the transmission failure of packet data or an AVPF Picture Loss Indication (PLI) signal indicating the loss of a packet during its transmission.

Figure 5:
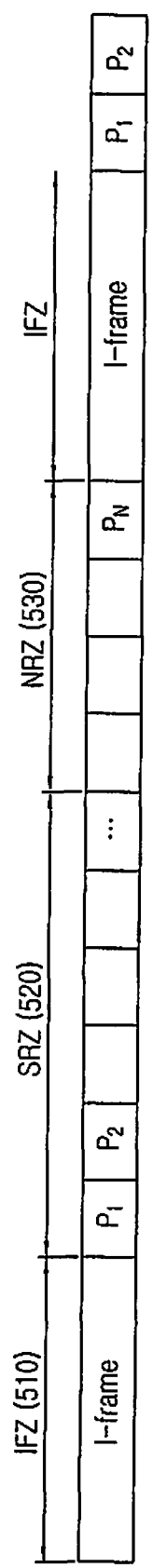
FIG. 5 is a diagram illustrating the zone concepts for intra-refreshing control according to an embodiment of the present invention.

FIG. 5 is a diagram illustrating the concepts of dividing one packet into zones defined as reference points at which an intra-refreshing request will be made according to an embodiment of the present invention.

Referring to FIG. 5, according to the present invention, the controller roughly sets the state of the current transmission video data in three regions using information on the frame delivered from the decoder of the receiver and sequence information of the corresponding frame in accordance with a delay (or transmission delay) between the transmitter and the receiver, and a frame rate or frames per second (hereinafter referred to as 'FPS'), thereby allowing the receiver to make an intra-refreshing request. As described above, when there is no transmission error, the video encoder of the transmitter repeats the process of compressing and transmitting N P-frames after transmitting one I-frame.

That is, the controller of the transmitter sets a video data region corresponding to the I-frame as an I-Frame Zone (IFZ) 510 in one transmission frame. Further, the controller sets a particular number of P-frame regions before the I-frame as a No-Response Zone (NRZ) 530. In addition, the controller classifies P-frames between the IFZ and the NRZ as a Selective Response Zone (SRZ) 520.

A size of the NRZ 530 can be variably set according to how frequently the controller will perform intra-refreshing. When the receiver makes an intra-refreshing request as an error occurs in the foremost P-frame of the NRZ 530, the controller of the transmitter defines the size of the NRZ 530 such that it should be consistent with the time where the video encoder of the transmitter periodically generates the I-frame.

Figure 6A:
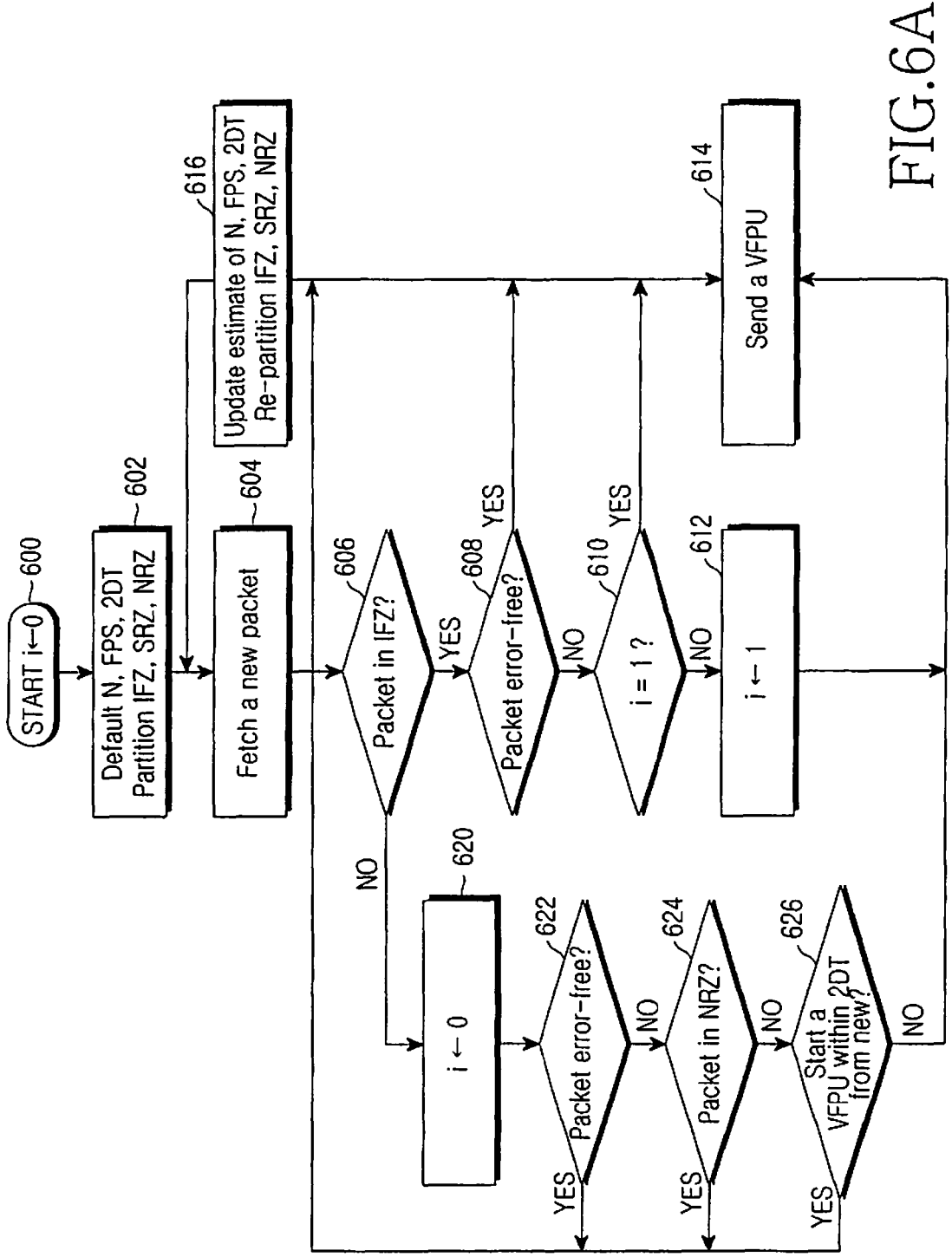
FIGS. 6A and 6B are flow diagrams illustrating an intra-refreshing control process of a receiver according to an embodiment of the present invention.

FIG. 6A is a flow diagram illustrating an intra-refreshing request operation of a receiver according to an embodiment of the present invention.

Referring to FIG. 6A, in step 600, The number of transmissions for the VFPU signal, due to the loss or error of an I frame, will be defined herein as 'i' and initialized to 0.

In step 602, the receiver receives a video stream transmitted over a wired/wireless channel. In this case, the receiver receives at least two I-frames to check the number N of P-frames existing between the two I-frames, and to check an average frame rate FPS. In addition, the receiver checks a 2-way delay (2DT), which is a sum of a delay from receiver to transmitter and a delay of the other direction.

Thereafter, the receiver sets the video stream transmitted over the channel frame as regions for efficiently performing intra-refreshing, i.e., as three separated regions for controlling the number of transmissions for the VFPU signal. The receiver sets the region corresponding to the I-frame as IFZ, sets a particular number of P-frame regions before the IFZ as NRZ, and sets P-frame regions located between the IFZ and the NRZ as SRZ which is a region for transmitting a selective VFPU signal according to the intra-refreshing.

In step 604, the receiver receives new video data (hereinafter also referred to as 'packet').

In step 606, the receiver determines whether the packet is video data corresponding to IFZ. If it is determined in step 606 that the packet is an I-frame, the receiver determines in step 608 whether there is any error in the packet. If there is any error in the packet, the receiver proceeds to step 610.

In step 610, the receiver intends to request intra-refreshing since there is an error in the I-frame, which is independently encoded image data. The receiver determines whether it has ever transmitted the VFPU signal for the same I-frame.

Therefore, upon detecting the fact that it has never transmitted the VFPU signal (or after checking the number ('i'=0), the receiver updates the number i to 1 in step 612. Thereafter, the receiver proceeds to step 614 where it transmits the VFPU signal to the transmitter. Therefore, the receiver requests transmission of the I-frame due to the occurrence of an error.

In step 616, the receiver receives the I-frame transmitted from the transmitter to recover the damaged image quality. In addition, the receiver resets a VFPU signal transmission region to guarantee efficient transmission of the VFPU signal, i.e., to guarantee efficiency of intra-refreshing. In this case, the receiver updates IFZ, NRZ and SRZ taking N, FPS and 2DT into account.

Herein, the receiver variably sets the parameters 2DT, FPS and N according to the channel state during the call over the video telephony. The receiver updates the parameters 2DT, FPS and N by periodical measurements, and changes the IFZ, SRZ and NRZ based thereon. The 2DT value can be provided by a network protocol, and the parameters FPS and N can be estimated by means of the video decoder of the receiver.

If it is determined in step 606 that the packet is not the video data corresponding to the IFZ, the receiver proceeds to step 620.

In step 620, the receiver sets the number i of transmissions to '0'.

In step 622, the receiver determines whether there is any error in the transmitted packet. If there is any error in the packet, the receiver proceeds to step 624.

In step 624, the receiver determines whether the packet is video data corresponding to the set NRZ. If the packet is the video data corresponding to NRZ, the receiver proceeds to step 616. That is, as the I-frame can be immediately transmitted, the receiver controls an operation of separately requesting and receiving an I-frame. In this manner, the receiver prevents the transmission due to the I-frame request.

If it is determined in step 624 that the packet is not the video data corresponding to NRZ, i.e., if it is determined that the transmitted packet is video data existing in the SRZ region, indicating the occurrence of an error, then the receiver determines in step 626 whether it has ever transmitted the VFPU signal within 2DT before the current time.

In this case, the receiver controls not to request separate I-frame transmission because it has previously transmitted the VFPU signal, i.e., because it will soon receive the I-frame for the previously transmitted VFPU signal, even though it should transmit the VFPU signal as there is an error in the packet of the SRZ region.

Therefore, after determining in step 626 whether the transmitted packet is the video data existing in the SRZ region, indicating the occurrence of an error, if it is determined that the receiver has transmitted the VFPU signal within 2DT before the current time, the receiver proceeds to step 616.

If it is determined in step 626 that the receiver has never transmitted the VFPU signal within 2DT from the current time, the receiver proceeds to step 614 where it makes an intra-refreshing request by transmitting a VFPU signal for the transmission packet of the SRZ region.

If it is determined that the packet is error free in step 608 or that i=1 in block 610, the receiver proceeds to step 616.

As described above, the receiver requests one-time intra-refreshing at the time where the error has first occurred, if the currently received video data is the video data received for IFZ, indicating the occurrence of an error. In addition, even if additional error occurs, as long as the video data is IFZ data, the receiver does not request the intra-refreshing.

If an error occurs in the video data received for NRZ, the receiver does not request intra-refreshing. This is due to the fact that even though the receiver does not requests the intra-refreshing, the receiver is expected to receive from the transmitter an I-frame already generated and transmitted. That is, as the receiver is expected to soon receive an I-frame, the receiver controls the unnecessary intra-refreshing request.

As to the video data of SRZ, after determining whether the receiver has recently requested intra-refreshing within 2DT, if it is determined that it has ever requested the intra-refreshing, the receiver does not additionally request the intra-refreshing because the corresponding I-frame will soon arrive. The receiver requests the intra-refreshing, if it has not made the intra-refreshing request yet. In actual implementation, 2DT can include further delays in the transmitter and receiver.

Figure 6B:
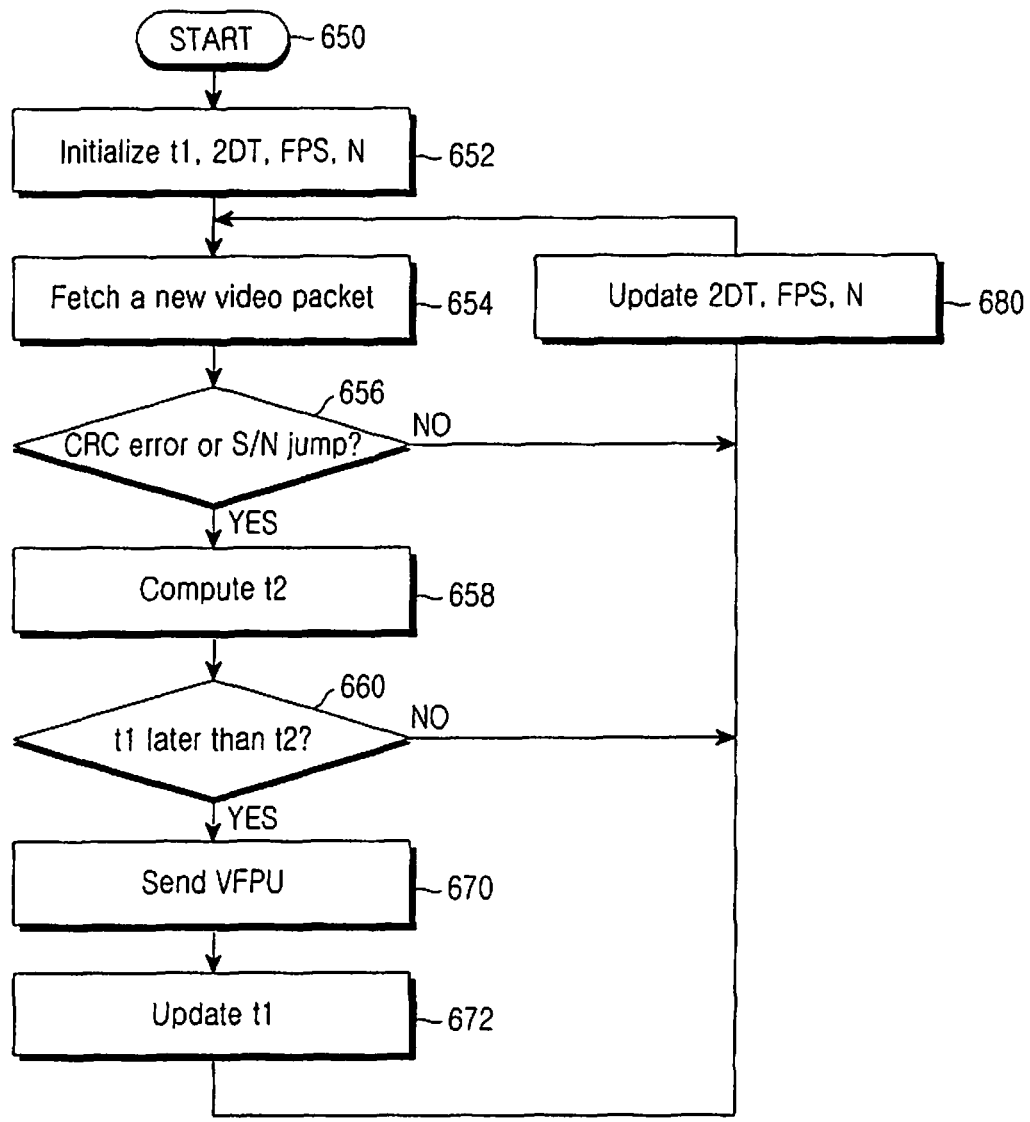

FIG. 6B is a block diagram illustrating an intra-refreshing request operation of a receiver according to another embodiment of the present invention.

Referring to FIG. 6B, in step 650, the receiver is in an intra-refreshing initialization state. In step 652, the receiver performs initialization on the time $t_1$ where the I-frame that the transmitter periodically compresses and transmits will arrive, and the 2DT, which is a sum of a delay from the transmitter to the receiver and a delay from the receiver to the transmitter. Further, the receiver receives a video stream transmitted over a wired/wireless channel. In this case, the receiver receives at least two I-frames to check the number N of P-frames existing between the two I-frames, and to check an average frame rate FPS.

In step 654, the receiver receives new video data (hereinafter also referred to as 'packet').

In step 656, the receiver checks CRC and S/N to determine whether there is any error in the packet and whether the packet has suffered a packet loss during its transmission. If the generated CRC is consistent with the transmitted CRC and the S/N is also equal to the expected value, the receiver proceeds to step 680 without the need to perform intra-refreshing, considering that the packet has not suffered a loss or an error. In step 680, the receiver updates 2DT, FPS and N, if necessary, and then returns to step 654.

However, if it is determined in step 656 that the generated CRC is inconsistent with the transmitted CRC or the S/N of the packet is greater than the expected value, the receiver proceeds to step 658, because the received video data includes an error therein or the video packet has not arrived at the receiver as it is lost during its transmission.

In step 658, the receiver, when it sends a VFPU to the transmitter to request intra-refreshing, computes the time $t_2$ where the requested I-frame will arrive at the receiver, and then proceeds to step 660. Herein, the time $t_2$ can be computed depending on the type and sequence information of the currently received frame, and the parameters FPS, 2DT and N. Herein, $t_1$ and $t_2$ can be computed as follows. If the currently received P frame is nth among N frames, since a time occupied by each P frame is approximately 1/FPS, $t_1$ is a time expired by (N-n)FPS from the current time, and $t_2$ is a value in which a protocol delay $d_1$ from the reception apparatus, a protocol delay $d_2$ from the transmission apparatus and a two-way delay 2DT are added.

In step 660, the receiver compares the time $t_1$ computed in step 652 with the time $t_2$ computed in step 658, to determine whether $t_2$ is earlier than $t_1$. If $t_2$ is earlier than $t_1$, the receiver proceeds to step 670 where it transmits a VFPU to the transmitter. Thereafter, in step 672, the receiver updates the time $t_1$, and then proceeds to step 680.

However, if it is determined in step 660 that the $t_2$ is equal to or later than $t_1$, the receiver proceeds to step 680 because it can recover the damaged image quality more rapidly by waiting for the I-frame that the transmitter periodically compresses and transmits, rather than sending a request for intra-refreshing to the transmitter by transmitting a VFPU to the transmitter.

The receiver updates the parameters 2DT, FPS and N by periodical measurements. As described above, the 2DT value can be provided by a network protocol, and the parameters FPS and N can be estimated by means of the video decoder of the receiver.

Figure 7:
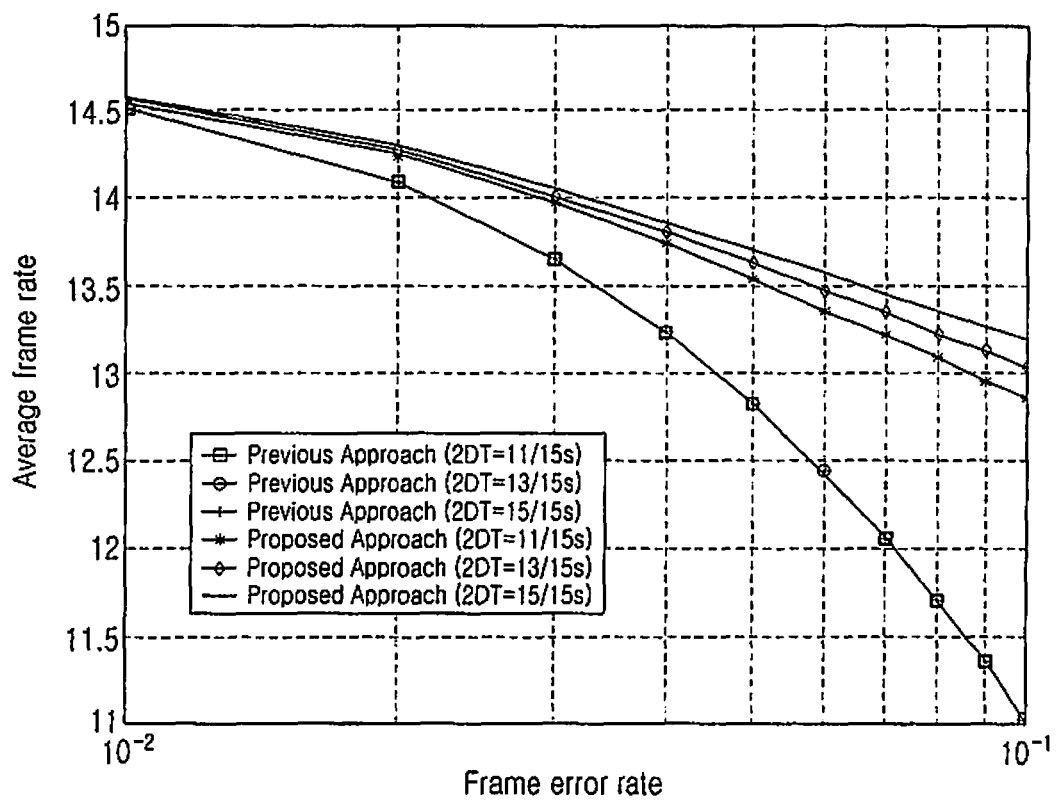
FIG. 7 is a diagram illustrating performance of an average frame rate under the control of the receiver according to an embodiment of the present invention.

FIG. 7 is a diagram illustrating performance of an average frame rate under the control of the receiver according to an embodiment of the present invention.

Referring to FIG. 7, it can be appreciated that the average frame rate by the present invention is higher than the average frame rate of previous approaches. It is assumed that 15 P-frames are generated per second and the I-frame is 4 times greater than the P-frame in size, 2 and 96 P-frame are generated after one I-frame.

It cannot be considered that the image quality increases with the mere increase in the average frame rate. This is due to the fact that the video image is a multidimensional signal having a time-domain characteristic and it is possible to omit the necessary intra-refreshing in the process of reducing the unnecessary intra-refreshing. In this case, as the average frame rate increases, the user may view the damaged image more frequently, so the increase in the average frame rate cannot be considered simply as improvement of the quality.

Figure 8:
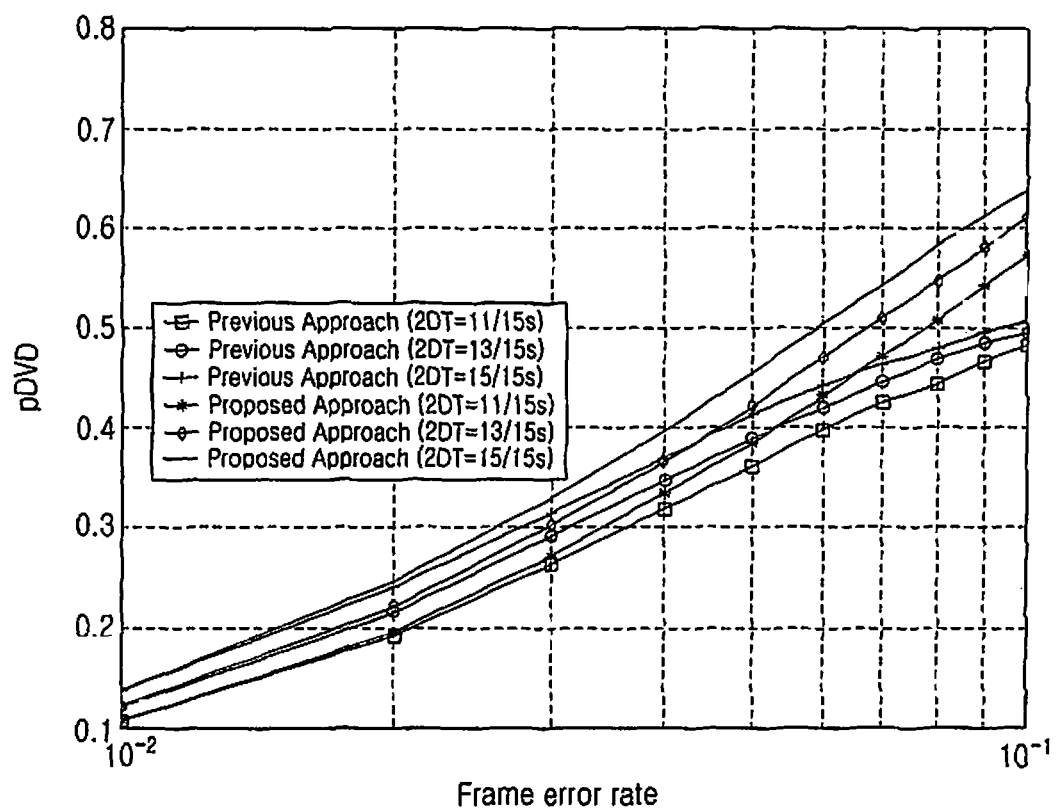
FIG. 8 is a diagram illustrating pDVD performance under the control of a receiver according to an embodiment of the present invention.

Therefore, to make up for the defects, FIG. 8 illustrates the results obtained by reducing the unnecessary intra-refreshing and improving the average frame rate.

FIG. 8 is a diagram illustrating pDVD performance of a receiver according to an embodiment of the present invention.

Figure 2:
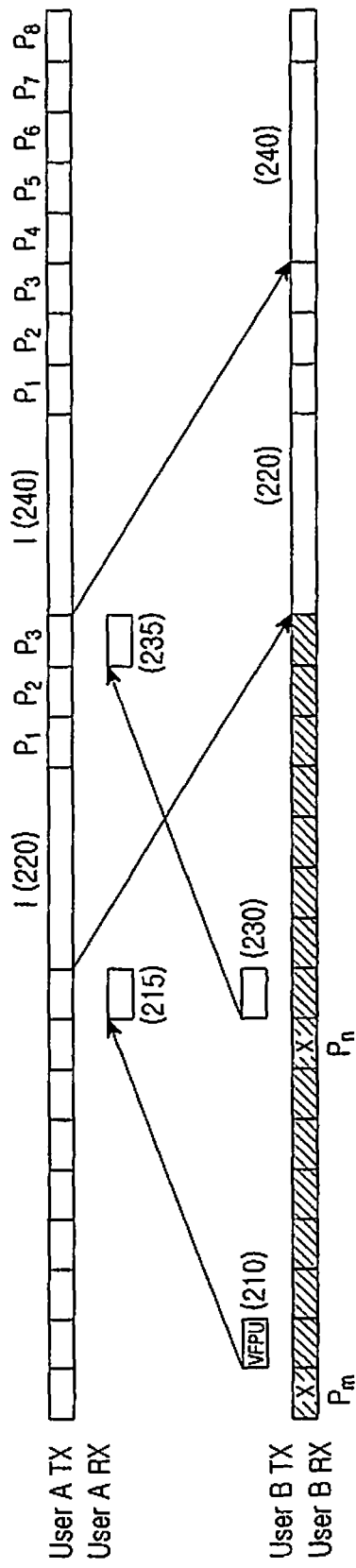
FIG. 2 is a timing diagram illustrating a possible intra-refreshing problem.
Figure 3:
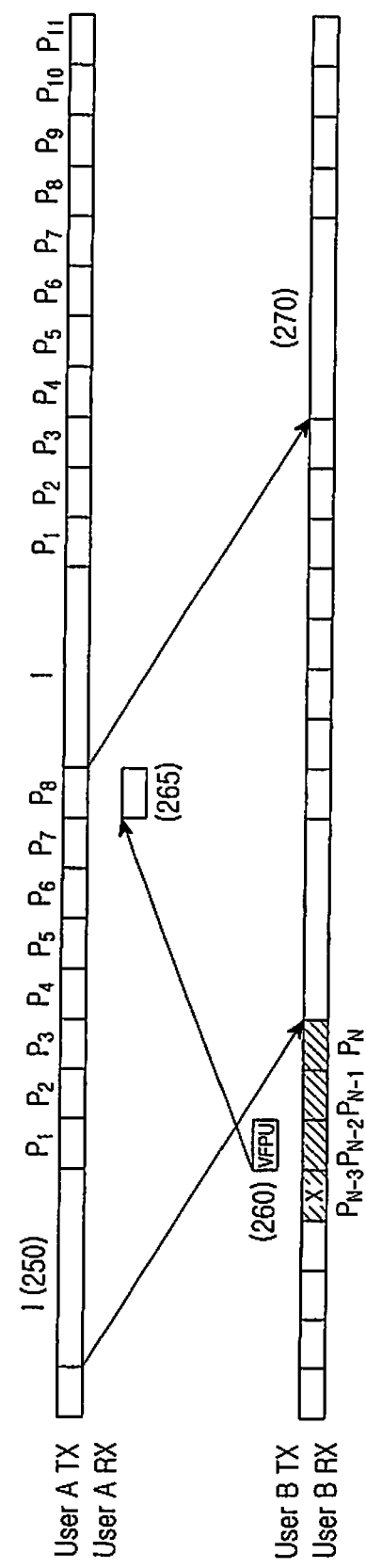
FIG. 3 is a timing diagram illustrating another possible intra-refreshing problem.

Referring to FIG. 8, percentage Degraded Video Duration (pDVD) can be used as an index for measuring quality of the video image which is a multidimensional signal having a time-domain characteristic. The pDVD indicates a ratio of the shaded (or hatched) region in FIGS. 2 and 3, i.e., the region from the time where information is damaged until the time where a new damage-free I-frame arrives. Therefore, as the pDVD value increases, the ratio of the damaged image increases, reducing the image quality.

As shown in FIGS. 7 and 8, though the intra-refreshing request operation according to the present invention increases the average frame rate, the pDVD difference between the present invention and the previous approaches is not as noticeable. In the embodiments of the present invention, therefore, it can be noted that the quality increase due to the increase in the average frame rate is greater than the quality decrease due to the increase in the interval for which the image is damaged.

In conclusion, the present invention provides an effect that as the full average frame rate increases, the video image quality increases, while there is no significant difference in the pDVD indicative of the ratio of the interval from the time where the data is damaged until the time a new damage-free I-frame arrives.

FIGS. 9 to 12 illustrate an intra-refreshing control operation of a transmitter according to an embodiment of the present invention. The present invention, as shown in FIGS. 9 to 12, is characterized by appropriately adjusting the frequency of performing the requested intra-refreshing according to the channel condition, thereby minimizing the decrease in the average video frame rate due to the unnecessary intra-refreshing and also minimizing the ratio of damaged image.

Figure 9:
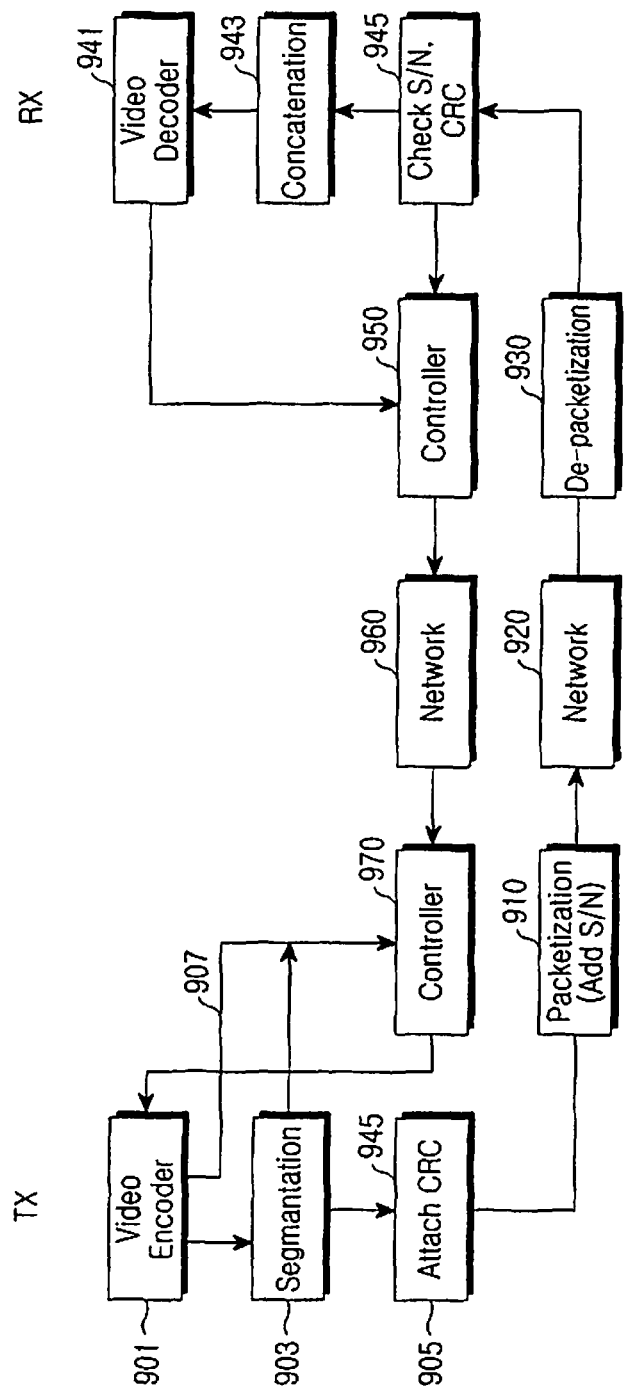
FIG. 9 is a diagram illustrating the architecture of the system with a transmitter for performing intra-refreshing control according to an embodiment of the present invention.

FIG. 9 is a diagram illustrating the architecture of the system with a transmitter for performing intra-refreshing control according to an embodiment of the present invention.

Referring to FIG. 9, the transmitter includes a video encoder 901, a segmentation block 903, an error detection block 905, and a packetization block (or Add S/N block) 910. A receiver includes a de-packetization block 930, an error detection block 945, a concatenation block 943, and a video decoder 941. Also included in FIG. 9 are networks 920, 960 and controllers 950, 970. The foregoing blocks are equal in operation to their corresponding blocks described in FIG. 4.

Particularly, in the transmitter according to an embodiment of the present invention, the video encoder 901 provides a controller 970 with type information 907 of the currently compressed video frame and sequence information of the corresponding frame. That is, the video encoder 901 provides information indicating whether the compressed video frame is a P-frame or an I-frame, and when the compressed corresponding frame is a P-frame, the video encoder 901 provides the controller 970 with sequence information indicating the sequence of the corresponding P-frame that the transmitter transmits after transmitting the I-frame.

Therefore, the controller 970 can transmit the I-frame, or perform or disregard intra-refreshing requested by the receiver in accordance with the type information of the compressed video frame, the sequence information of the corresponding frame, and the 2DT. That is, the controller 970 adaptively transmits an I-frame in response the intra-refreshing request from the receiver, to allow the receiver to recover error-occurred video data.

The operation of the controller 970 will be described in more detail with reference to FIGS. 10A and 10B.

Figure 10A:
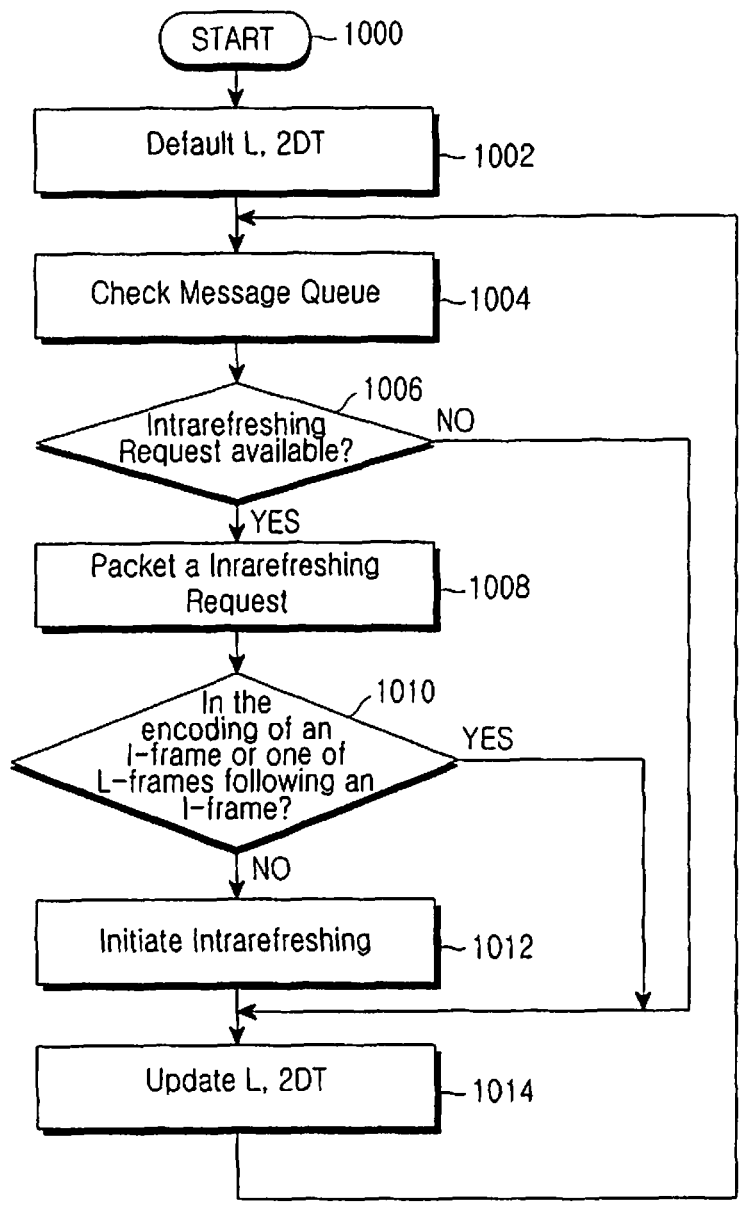
FIGS. 10A and 10B are flow diagrams illustrating an intra-refreshing control process of a transmitter according to an embodiment of the present invention.

FIG. 10A is a diagram illustrating a process of performing intra-refreshing control by a transmitter according to an embodiment of the present invention.

Referring to FIG. 10A, in step 100, the transmitter is in an intra-refreshing initialization state. In step 1002, the controller of the transmitter receives, from a video encoder, the type information of the compressed video frame and the sequence information of the frame. In this case, the transmitter initializes and sets a parameter L, which is defined as the number of P frames after an I-frame. If the receiver receives the intra-refreshing request while it is transmitting an I-frame or L P-frames, the receiver will ignore the intra-refreshing request since the I-frame it is transmitting or just sent will recover the image quality.

In step 1004, the transmitter checks the type of the frame currently being compressed by the video encoder, and/or the sequence information indicating the sequence of the currently compressed P-frame. That is, the transmitter checks the compressed video data that it now intends to transmit.

In step 1006, the transmitter determines whether there is any intra-refreshing request from the receiver. If there is no intra-refreshing request in step 1006, the transmitter proceeds to step 1014 where it updates the set L and 2DT. That is, the transmitter sets the L and 2DT depending on the channel condition so as to efficiently perform intra-refreshing.

However, if there is any intra-refreshing request from the receiver in step 1006, the transmitter proceeds to step 1008 where it receives an intra-refreshing request from the receiver. Therefore, in step 1010, the transmitter determines whether the video data currently compressed by the video encoder corresponds to the I-frame or an earlier-than-$L^{th}$ P-frame that the video encoder has compressed after compressing and transmitting the I-frame.

If step 1010 is not satisfied, meaning that the transmitter will perform intra-refreshing at the request of the receiver, the transmitter proceeds to step 1012 where it compresses and transmits the I-frame. Thereafter, in step 1014, the transmitter newly updates the L and 2DT depending on the channel condition. Here, the L and 2DT can be set considering the current frame rate, and in particular, the 2DT can be provided by the network protocol.

However, if it is determined in step 1010 that the video data currently compressed by the video encoder is the I-frame or the earlier-than-$L^{th}$ P-frame that the transmitter compresses after compressing and transmitting the I-frame, the transmitter proceeds to step 1014.

As described above, the controller of the transmitter periodically checks a message queue to determine whether an intra-refreshing request signal has arrived from the receiver. When channel condition is good, it is appropriate to set a great L value to reduce the intra-refreshing frequency, and when the channel condition becomes poor, the transmitter can decrease the L value. In addition, the controller of the transmitter estimates the channel condition depending on the frequency of the received intra-refreshing request, and updates the L value according thereto.

Figure 10B:
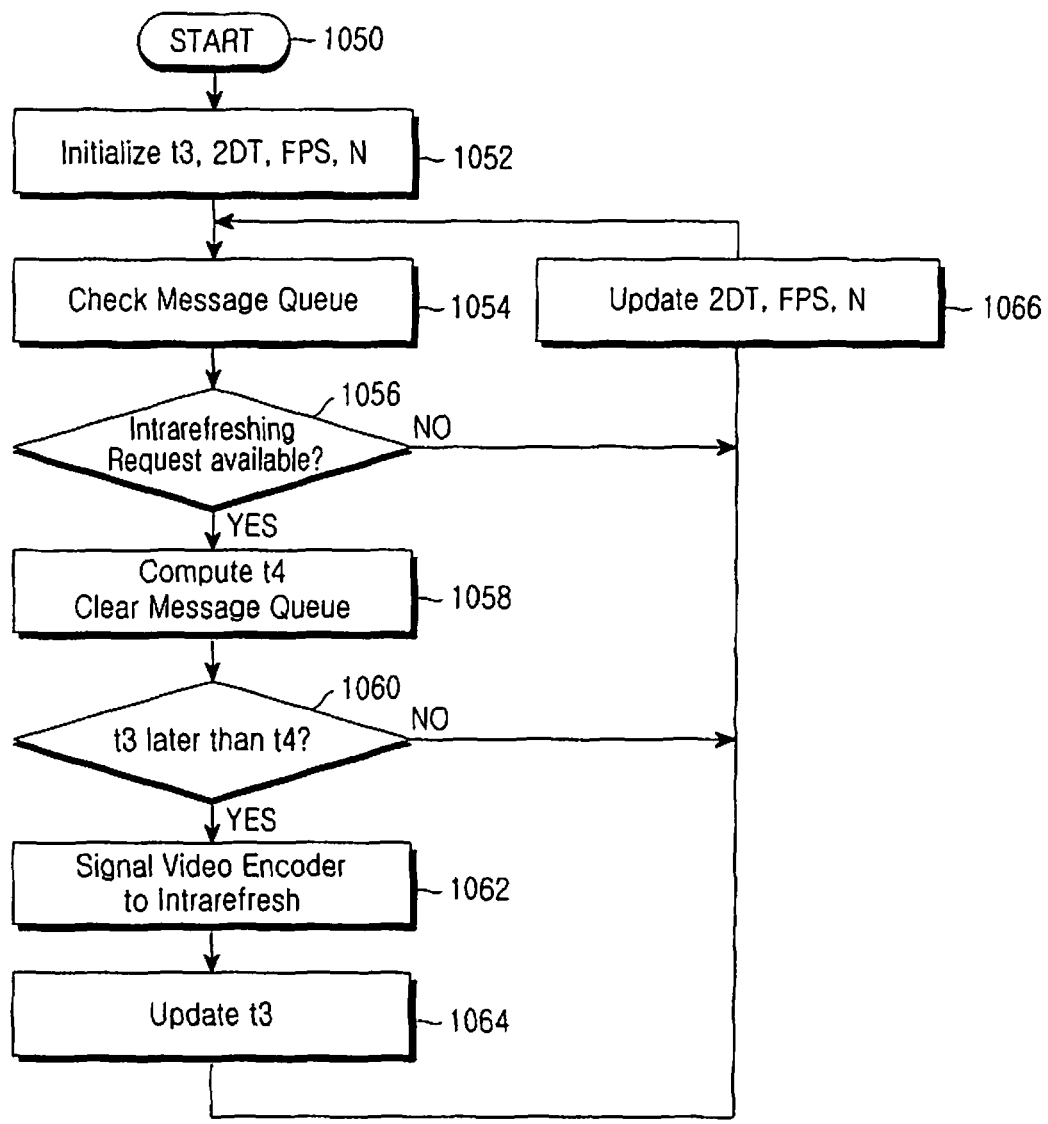

FIG. 10B is a diagram illustrating a process of performing intra-refreshing control by a transmitter according to an embodiment of the present invention.

Referring to FIG. 10B, in step 1050, the transmitter is in an intra-refreshing initialization state. In step 1052, the controller of the transmitter receives from the video encoder the type information of the compressed video frame and sequence information of the frame. At this point, the transmitter initializes the 2DT, FPS and N, and the time $t_3$ where the I-frame last transmitted by the transmitter will arrive at the receiver. In step 1054, the transmitter checks the received message queue. In step 1056, the transmitter determines whether the message is an intra-refreshing message requested from the receiver. If no intra-refreshing is requested, the transmitter proceeds to step 1066 where it updates the set 2DT, FPS and N.

However, if intra-refreshing is requested from the receiver in step 1056, the transmitter proceeds to step 1058 where it computes the time $t_4$ where the receiver requested the intra-refreshing, and clears the message queue. Here, the time $t_4$ can be computed depending on the 2DT and the processing time of each protocol.

Thereafter, in step 1060, the transmitter compares $t_3$ with $t_4$. If $t_3$ is later than or equal to $t_4$ as a result of the comparison, the transmitter proceeds to step 1066 without accepting the intra-refreshing request from the receiver, because the I-frame has arrived at the receiver after the receiver sent an intra-refreshing request to the transmitter, the damaged image quality has been recovered by the I-frame. Herein, $t_3$ means the transmission time of the periodically transmitted I-frame. In step 1066, the transmitter periodically updates the 2DT, FPS and N.

However, if $t_3$ is earlier than $t_4$ as a result of the comparison in step 1060, the transmitter proceeds to step 1062, because after the I-frame compressed and transmitted by the transmitter has arrived at the receiver, the video data has suffered a loss or an error. In step 1062, the controller of the transmitter commands the video encoder 901 to immediately compress the I-frame. Thereafter, in step 1064, the transmitter updates the time $t_3$ at which the last transmitted I-frame will arrive at the receiver, and then proceeds to step 1066 where it updates 2DT, FPS and N. As described above, the 2DT can be provided by the network protocol, and the FPS and N are provided from the video encoder.

Figure 11:
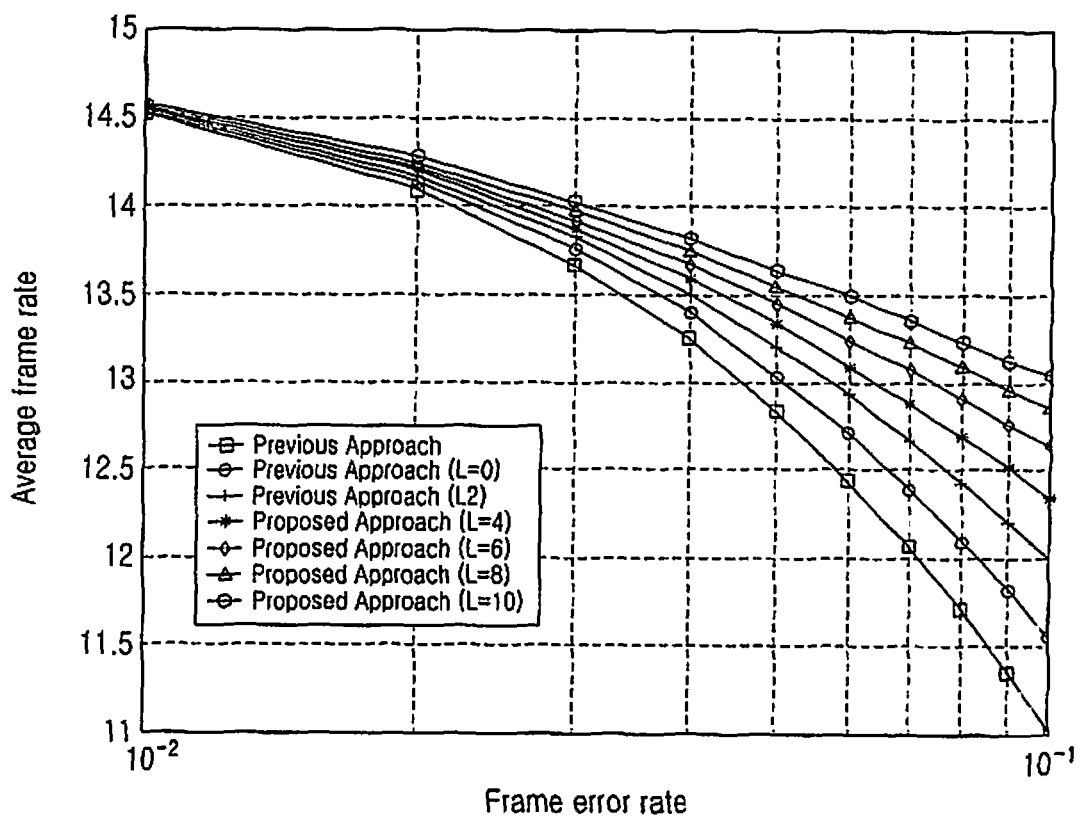
FIG. 11 is a diagram illustrating average frame rate performance under the control of a transmitter according to an embodiment of the present invention.

FIG. 11 is a diagram illustrating average frame rate performance under the control of the transmitter according to an embodiment of the present invention.

Referring to FIG. 11, there is shown a comparison result between an average frame rate by the present invention and an average frame rate by previous approaches. Similarly, assuming that during transmission of video data, 15 P-frames are generated per second and the I-frame is 4 times greater than the P-frame in size, then 296 P-frame are generated after one I-frame and 2DT=12/15 seconds.

It can be appreciated that the average frame rate by the present invention is higher than the average frame rate by the previous approaches. Here, the average frame rate increases with an increase in the L value which is set to disregard the intra-refreshing according to the channel condition.

Similarly, it cannot be considered that the image quality increases with the mere increase in the average frame rate. This is due to the fact that the video image is a multidimensional signal having a time-domain characteristic and it is possible to omit the necessary intra-refreshing, if necessary, in the process of reducing the unnecessary intra-refreshing. Therefore, to make up for the defects, FIG. 12 illustrates the results obtained by reducing the unnecessary intra-refreshing and improving the average frame rate.

Figure 12:
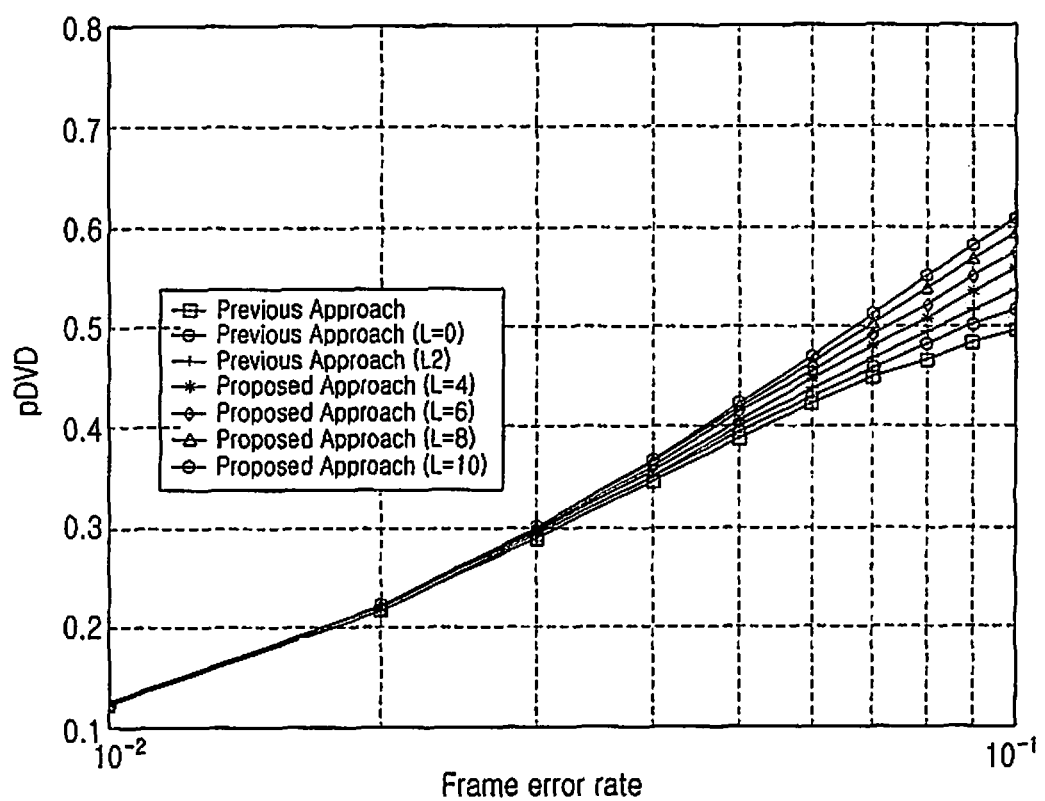
FIG. 12 is a diagram illustrating pDVD performance under the control of a transmitter according to an embodiment of the present invention.

FIG. 12 is a diagram illustrating pDVD performance under the control of a transmitter according to an embodiment of the present invention.

Referring to FIG. 12, there is shown a comparison between pDVD by the present invention and pDVD by the previous approaches. It can be appreciated that the pDVD by the present invention increases with the increase in the L value.

That is, according to the embodiments of the present invention, the transmitter disregards the received intra-refreshing request, while it is compressing the I-frame, or compressing an $L^{th}$ P-frame after compressing the I-frame. In this case, the transmitter adjusts the L value for disregarding the intra-refreshing requested from the receiver, according to the wireless channel condition. That is, it is possible to adjust the L value so as to improve the time-space quality of the image. This can be utilized for adjusting the characteristics of different video encoders, such as, for example, MPEG-4 and H.264 encoders, according to the network situation.

As is apparent from the foregoing description, according to the present invention, the transmitter can adjust the intra-refreshing frequency according to the channel condition without performing the intra-refreshing requested from the receiver every time, i.e., without transmitting the I-frame in response to the requested intra-refreshing every time. As a result, the present invention can increase the full average frame rate due to the unnecessary intra-refreshing, and minimize the ratio of the image damaged due to the insufficient intra-refreshing.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method for requesting a packet of a reception apparatus in a communication system, the method comprising:
   checking a Cyclic Redundancy Check (CRC) for received video packet to detect an error or a loss of the video packet;

generating a control signal for requesting the packet taking into account a sequence number of the video packet when the error or the loss of the video packet is detected; and transmitting the generated control signal to a transmission apparatus.

2. The method of claim 1, further comprising:

decoding the received video packet to check frame type information, wherein the control signal is generated based on the sequence number and the frame type information.

3. The method of claim 1, further comprising:

computing an arrival time t2 of an I-frame obtained by compressing an independent image to be temporarily transmitted from the transmission apparatus in response to the control signal;

comparing an arrival time t1 of the I-frame transmitted at periods, with the arrival time t2; and when t1 is later than t2, transmitting the control signal to the transmission apparatus.

4. The method of claim 1, further comprising:

when t1 is equal to or earlier than t2, holding the transmission of the control signal to the transmission apparatus, and waiting for a periodically transmitted I-frame.

5. The method of claim 1, further comprising:

decoding the received video packet to determine whether the frame type information indicates a periodically transmitted I-frame, or a P-frame obtained by compressing a difference between video packet at a transmission time and video packet before the transmission time; and acquiring a sequence number indicating a sequence of a corresponding P-frame transmitted after the I-frame is transmitted.

6. The method of claim 1, further comprising:

defining a first region for requesting transmission of an I-frame, a third region for waiting for a periodically transmitted I-frame, and a second region, located between the first region and the third region, for selectively requesting transmission of an I-frame, taking into account the frame type information and the sequence number; and selectively transmitting the control signal to the transmission apparatus taking into account the defined regions.

7. The method of claim 3, further comprising:

computing the time t1 and the time t2 depending on a two-way delay between the transmission apparatus and the reception apparatus; and comparing the time t1 with the time t2, and transmitting the control signal for requesting intra-refreshing to the transmission apparatus according to the comparison result.

8. The method of claim 1, further comprising:

transmitting, when the reception apparatus is based on a circuit-switched system, the control signal to the transmission apparatus using a Video Fast Picture Update Command (VFPU), and transmitting, when the reception apparatus is based on a packet-switched system, the control signal to the transmission apparatus using an AVPF Negative Acknowledgement (NACK) signal indicating transmission failure of the video packet, and AVPF Picture Loss Indication (PLI) indicating a loss of the video packet during its transmission.

9. A reception apparatus for requesting a packet in a communication system, the reception apparatus comprising:

an error detection block for checking a Cyclic Redundancy Check (CRC) for received video packet to detect an error or a loss of the video packet; and a controller for generating a control signal for requesting the packet taking into account a sequence number of the video packet, and transmitting the generated control signal to a transmission apparatus.

10. The reception apparatus of claim 9, further comprising:

a decoder for decoding the received video packet to check frame type information, wherein the control signal is generated based on the sequence number and the frame type information.

11. The reception apparatus of claim 9, wherein the controller:

computes an arrival time t2 of an I-frame obtained by compressing an independent image to be temporarily transmitted in response to the control signal after transmitting the control signal to the transmission apparatus;

compares the arrival time t2 with an arrival time t1 of an I-frame transmitted at periods; and when t1 is later than t2, transmits the control signal to the transmission apparatus.

12. The reception apparatus of claim 11, wherein:

when t1 is equal to or earlier than t2, the controller holds the transmission of the control signal to the transmission apparatus, and waits for a periodically transmitted I-frame.

13. A method for transmitting a packet of a transmission apparatus in a communication system, the method comprising:

determining whether a control signal for requesting transmission of a packet obtained by compressing an independent image is received from a reception apparatus;

checking a sequence number of a video packet being compressed;

determining whether to temporarily transmit the packet based on the received control signal or to transmit a packet based on a predetermined period, taking into account the checked sequence number; and transmitting the packet to the reception apparatus using a variable time according to the determination on temporarily transmitting the packet.

14. The method of claim 13, further comprising:

computing a time t4 at which the control signal was requested from the reception apparatus;

comparing the computed time t4 with a transmission time t3 of an I-frame transmitted at periods; and when t3 is earlier than t4, temporarily transmitting the I-frame to the reception apparatus according to the control signal.

15. The method of claim 13, further comprising:

when t3 is equal to or later than t4, holding temporary transmission of the packet according to the control signal, and transmitting the packet based on the predetermined period.

16. The method of claim 13, further comprising:

determining transmission of an intra-refreshing requested packet taking into account a two-way delay between the transmission apparatus and the receiver apparatus, and a number of P-frames obtained by compressing a difference between current video packet being lost due to the transmission of the packet and a previous video packet.

17. The method of claim 14, further comprising:

variably adjusting a transmission period of an I-frame intra-refreshing requested from the reception apparatus taking into account a sequence number of a P-frame obtained by compressing a difference between the current video packet and the previous video packet.

18. The method of claim 15, further compressing:
variably adjusting a transmission period for transmitting the packet taking into account a channel condition between the transmission apparatus and the reception apparatus after transmitting the packet, and transmitting the I-frame to the reception apparatus using the adjusted transmission period.

19. A transmission apparatus for transmitting a packet in a communication system, the transmission apparatus comprising:
a controller for determining whether a control signal for requesting transmission of a packet obtained by compressing an independent image is received from a reception apparatus, checking a sequence number of a video packet being compressed, and determining whether to temporarily transmit the packet based on the received control signal or to transmit the packet based on a predetermined period, taking into account the checked sequence number; and
an encoder for compressing video data into an independent image using a variable time and transmitting the packet to the reception apparatus according to the determination of the controller on temporarily transmitting the packet.

20. The transmission apparatus of claim 19, wherein the controller:
computes a time $t4$ at which the control signal was requested from the reception apparatus;
compares the computed time $t4$ with a transmission time $t3$ of an I-frame transmitted at periods; and
when $t3$ is earlier than $t4$, temporarily transmits the I-frame to the reception apparatus according to the control signal.

21. The transmission apparatus of claim 20, wherein:
when $t3$ is equal to or later than $t4$, the controller holds temporary transmission of the packet according to the control signal, and transmits the packet based on the predetermined period.

* * * * *